Jan. 1, 1929.

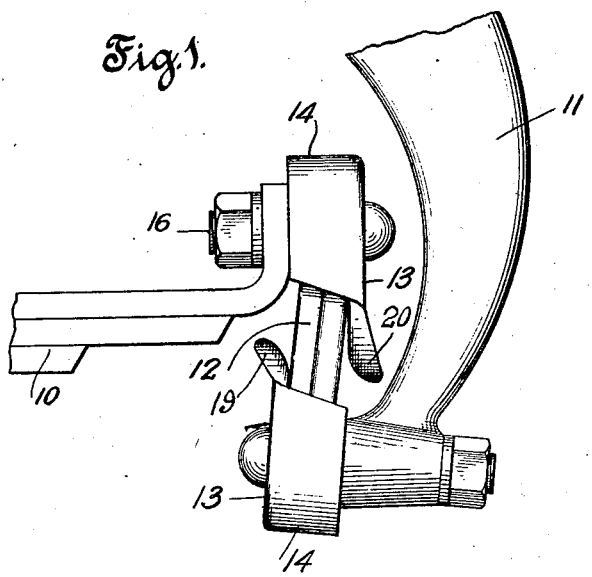
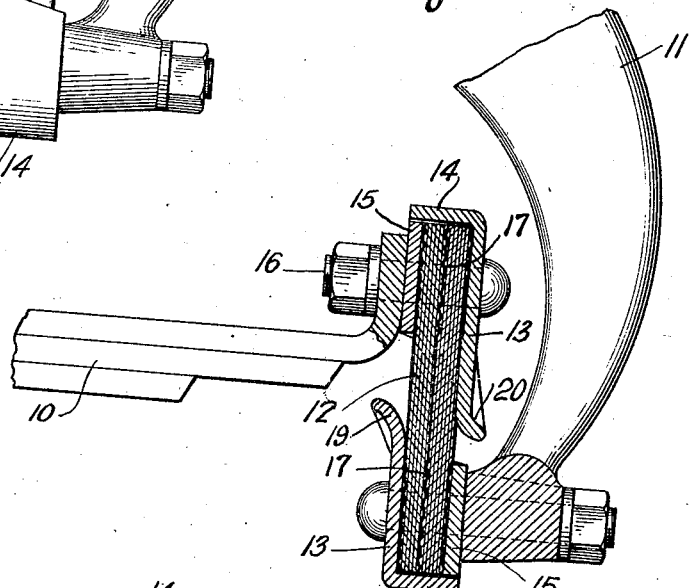
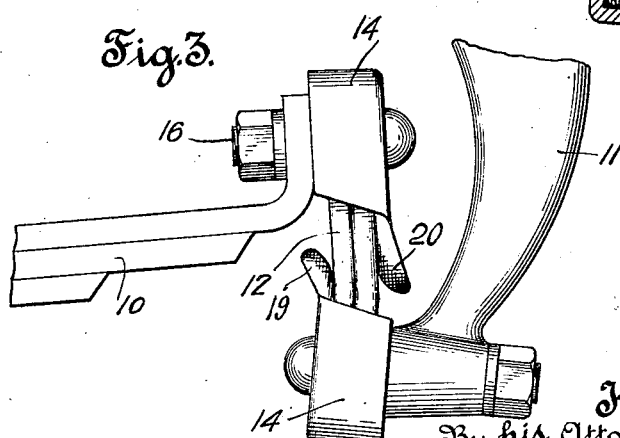

H. W. BELL 1,697,452

SPRING SHACKLE

Filed June 27, 1922    2 Sheets-Sheet 2

Inventor
Harvey W. Bell
By his Attorney
E. W. Marshall

Patented Jan. 1, 1929.

1,697,452

UNITED STATES PATENT OFFICE.

HARVEY W. BELL, OF YONKERS, NEW YORK, ASSIGNOR TO THE BELOYT CORPORATION, OF DOVER, DELAWARE, A CORPORATION OF DELAWARE.

SPRING SHACKLE.

Application filed June 27, 1922. Serial No. 571,185.

This invention relates to spring shackles of the type covered in previous applications of mine and embodying a strip of material, usually fabric, such as impregnated canvas belting, rigidly secured at separated points to the parts which it connects and substantially inflexible in one plane while freely flexible at right angles thereto to control side sway or other objectionable movements while allowing for the normal flexing movements of the spring.

Particular objects of the invention are to improve the mounting and the securing of the supporting strips so as to enable the strips to carry the maximum load of which they are capable, without wear or tearing of the same and without interfering with the desired flexing of the same.

Other objects relate to the production of the article in a simple, inexpensive, commercial form, readily applicable to the spring suspension and of light weight and neat, attractive appearance.

Further objects and various novel features of construction, combination and relation of parts which make possible the attainment of such objects will appear as the specification proceeds.

In the drawings accompanying and forming part of this specification I have illustrated but one simple embodiment of the invention and wish it understood that the structure may be modified in various respects without departure from the true spirit and scope of the invention as hereinafter defined and claimed.

Figure 1 is a fragmentary view showing the shackle applied and used as the connection between the rear end of the frame and the rear end of the rear spring, with the spring substantially flat as under a moderate or normal load.

Figure 2 is a similar view showing the spring as deflected under maximum load and illustrating how under these conditions the flexible web or link is substantially straight, with the load evenly distributed.

Figure 3 is another fragmentary view illustrating the snubbing action which takes place on the rebound of the spring.

Figure 4:
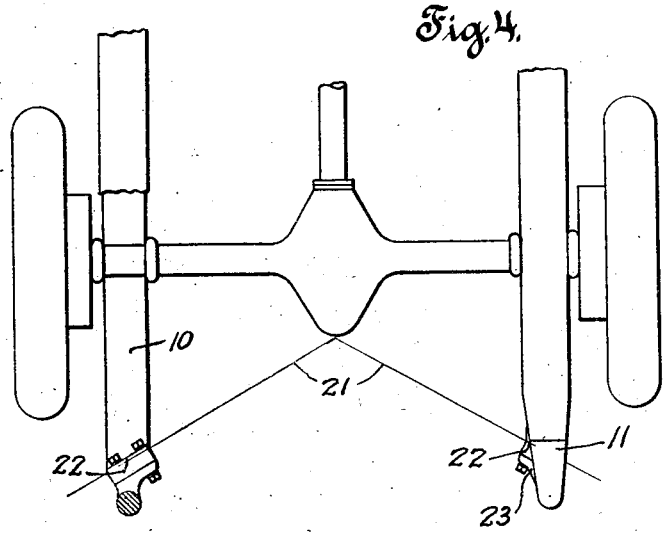
Figure 4 is a broken plan view illustrating a method of mounting the shackles to avoid twisting of the springs.

The numeral 10, where it appears in the several views, designates the rear spring of a motor vehicle and 11 the side sills of the frame.

The body of the shackle consists in the present disclosure of two superposed substantially flat strips 12 of flexible fabric such as rubber impregnated canvas belting, which strips are rigidly clamped together and immovably secured at their opposite ends to the spring and frame respectively.

The clamps for securing the strips consists in the present disclosure of box-like holders each having a substantially flat back wall 13 with a projecting rim or flange 14 extending about the end and partly about the two side edges of the back wall to form a box which is open at the front to receive the end portion of the link. This open side of the box is closed by a clamp plate 15 shaped to fit within the outstanding rim or flange and secured in the present instance by a pair of bolts 16.

To obtain a firm and positive grip on the fabric the clamping faces are preferably roughened or corrugated and this effect is accomplished in the case illustrated by interposing corrugated washers 17 between the strips composing the links and also between the outer faces of the strips and the adjoining clamping faces of the box and cooperating clamp plate. The use of these separate gripping washers or plates permits of the box and clamp plate being struck up out of sheet metal strong enough to carry the load and too heavy for corrugating conveniently.

Figure 7:
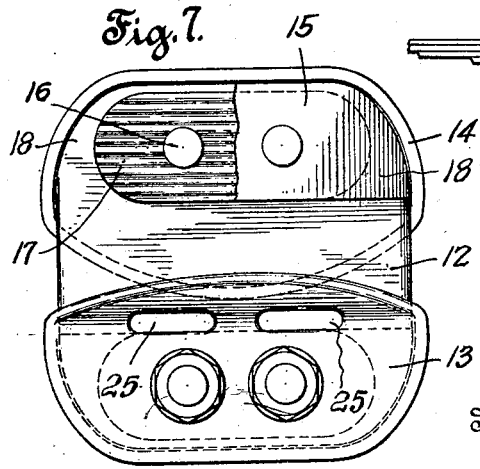
Figure 7 is a detached detail view of the shackle unit.

A special feature of the clamping is that the washers providing the gripping surface do not extend the full width of the webs or strips. This is illustrated in Figure 7, which shows how there is left an unclamped area 18 at each edge of the strip, the purpose of which is to operate as a guard standing beyond the gripped portion of the strip and serving by taking a portion of the strain to relieve the clamp portion sufficiently to prevent any tearing at the edge of the held portion. This guard edge may be relatively narrow and is shown as tapered off and merging into the end edge of the strip.

To exert a certain measure of control over the flexing of the shackles and to snub the rebound action of the springs, the boxes are provided with extensions 19, 20 designed to stand in substantially overlaping relation at the opposite faces of each link. These shoulders may be formed as extensions of the back walls of the boxes and are preferably arranged on slightly flaring lines and curved convexly at their upper edges, as shown most clearly in Figure 7. This curvature causes the thrust shoulders as they come into action to stress the middle portion of the link somewhat more than the edge portions, thus relieving the edge portions of any undue strain.

Figures 2 and 3 illustrate how in the movement of the parts from the maximum to the minimum load conditions the divergent or curved thrust shoulders have a rolling movement over the opposite faces of the link until finally in the rebound position of the spring (Figure 3) the shoulders come together against the link with a compressive force to cushion the rebound movement.

To equalize the strain at both faces of the link the parts are preferably assembled and set up fast with both faces of the link parallel when in the condition of maximum load, as in Figure 2. This enables the link to carry the maximum load of which it is capable and permits the use of lighter material than would otherwise be possible.

Figure 5:
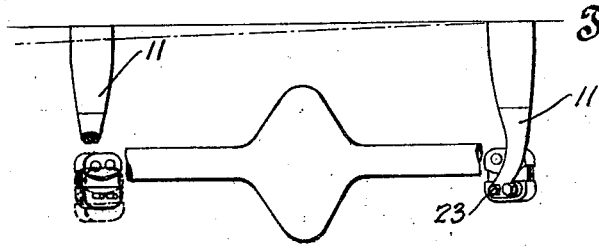
Figure 5 is a rear end view illustrating diagrammatically how the non-twisting result is effected.
Figure 6:
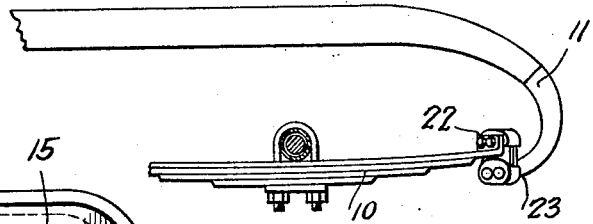
Figure 6 is a broken side elevation and part sectional view illustrating further the inclined mounting of the shackle.

Because of the fact that the link is quite stiff and substantially inflexible in its flat plane and is rigidly held at its opposite ends it serves to prevent side sway and other objectionable movements, while its flexibility in other planes provides all the desired freedom of spring action. To prevent twisting of the springs with the attendant liability of breakage, the shackles may be arranged as indicated in Figures 4, 5 and 6, with the flat planes of the links inclined to the length of the spring on lines, which as shown at 21 in Figure 4 converge to a point within the outline of the frame. For this purpose the springs are here shown as having their ends 22 turned up on an incline, instead of at a right angle, with the longest portion of the spring at the outside, and similarly, the securing pads 23 at the ends of the side sills are inclined in substantial parallelism with the spring lugs 22. The side sills 11 usually stand directly above the springs, as shown in Figure 5.

With the inclined construction disclosed, the outer edge of the spring is longer than the inner edge and so the travel of the outer edge is greater than that of the inner edge. This means that the outer edge of the link will have a longer swing than the inner edge, as shown by the radius 24 drawn from the approximate center of the rocking motion. In other words, the link travels in accord with the flexing movement of the spring and without exerting a twisting effort thereon.

In this invention the fabric web or link is covered and fully protected at the ends, where protection is most necessary. The boxes may be applied to the ends of the fabric links and the whole treated as a unit structure, substantially as indicated in Figure 7, ready for application to the vehicle parts at any time. The fabric is held rigidly and immovably but in such a way as to prevent injury to the same, and to enable it to carry the maximum load without straining or tearing. To prevent sand and grit or other foreign matter collecting between the lower thrust shoulder and the adjacent face of the web, the extension forming the thrust shoulder may have one or more clearance openings therethrough, substantially as indicated at 25.

What I claim is:

1. A spring shackle comprising a substantially flat link practically inflexible in its flat plane but flexible at right angles thereto and clamps rigidly engaged with opposite end portions of such link and having clamping area of less extent than the width of the link.

2. A spring shackle comprising a substantially flat link practically inflexible in its flat plane but relatively flexible at right angles thereto, a boxing receiving the end portion of the link but open at one side, a clamp plate substantially closing the open side of the boxing and engaged over the portion of the link exposed at such open side and means for securing such clamp plate in position.

3. The structure of claim 2 with a corrugated or roughened washer seated in the boxing in engagement with the face of the link.

4. The structure of claim 2 with a corrugated or roughened washer of less width than the boxing seated in the boxing in engagement with the face of the link.

5. The structure of claim 2 in which the boxing has an extension overlying one face of the link.

6. A spring shackle comprising a flexible link, open sided boxes receiving opposite end portions of the link and clamp plates overlying the end portions of the link and substantially closing the open sides of the boxes.

7. A spring shackle comprising a flexible link, open sided boxes receiving opposite end portions of the link and clamp plates overlying the end portions of the link and substantially closing the open sides of the boxes, said boxes being provided with extensions projecting therefrom on divergent lines over the opposite faces of the link.

8. The structure of claim 7 in which one of said extensions has a clearance opening or openings therethrough.

9. The structure of claim 7 in which the extensions have substantially curved edges.

10. The structure of claim 7 in which the extensions stand in substantially overlapping relation.

11. A spring shackle comprising a flexible link, means for rigidly securing separated portions of the same to the parts to be connected and means operating in the flexure of the link to apply greater stress to the intermediate than to the edge portions of the link.

12. A spring shackle comprising a flexible link, means for rigidly securing separated portions of the same to the parts to be connected and means operating in the flexure of the link to apply greater stress to the intermediate than to the edge portions of the link, and each including an abutment overlying the link and presenting a convexly curved shoulder to the face of the link.

13. A spring shackle comprising a flexible link, means rigidly securing opposite end portions of the same to the parts to be connected and thrust members at the opposite sides of the link having greater length at the intermediate than at the edge portions of the link.

14. The structure of claim 13 in which such intermediate portions of greater length are convexly curved and stand in substantially overlapping relation.

15. In a vehicle suspension, the combination with the side sills and the side springs, of substantially flat suspension links connecting the sills and springs and arranged with their flat planes on lines intersecting at a point inside the frame of the car.

16. In a vehicle suspension, a link of compressible material connecting the members of the spring suspension and overlapped elements at opposite sides of the link normally free of the same but adapted to engage the link under compression upon rebound of the spring to thereby operate as a rebound check.

17. A supporting link for vehicle parts comprising a substantially flat web of flexible material and attaching brackets rigidly secured to the opposite ends of said web and standing at an angle to the flat plane of the web.

18. The structure of claim 17 in which the brackets are substantially parallel to each other.

19. A spring shackle comprising a substantially flat link practically inflexible in its flat plane but flexible at right angles thereto, a clamp secured at each end of said link, and a friction washer of less width than the link positioned between each clamp and said link.

20. A spring shackle comprising a plurality of substantially flat links practically inflexible in its flat plane but flexible at right angles thereto, a clamp secured at each end of said links, and friction washers narrower than the links positioned between adjacent links and between said links and said clamps.

21. In a vehicle suspension, the combination with the side sills and side springs, of substantially flat suspension links connecting the said sills to the said springs and hanging in practically straight plane when said vehicle suspension is put under maximum load.

22. In combination, a strip of fabric and means for enclosing the end of said strip and permitting the same to be rigidly attached to a support, said means comprising a pair of clamping members for engaging the opposite sides of the said fabric and provided with an end portion so as to completely enclose the said end of the fabric, and securing members passing through said clamping members and through said fabric and adapted to cooperate with said support for rigidly securing the parts in position.

23. In combination, a strip of fabric and clamping members for engaging the opposite sides of the said fabric and provided with an end portion so as to completely enclose and snugly fit the end of said fabric, corrugated surfaces of less width than the fabric being provided for transmitting the pressure of said clamping members to the fabric, and a fastening member for firmly uniting said clamping members to the said fabric.

24. In combination, a strip of fabric and clamping members for engaging the opposite sides of the said fabric and provided with an end portion so as to completely enclose the end of said fabric, a plurality of corrugated washers positioned between the faces of the said fabric and the clamping members, and a fastening member for firmly uniting said clamping members to the said fabric.

25. In combination, a strip of fabric and clamping members for engaging the opposite sides of the said fabric and provided with an end portion so as to completely enclose the end of said fabric, corrugated surfaces being provided for transmitting the pressure of said clamping members to the fabric, said surfaces being of smaller area than the area of the said end of the fabric so as to provide an unclamped area of fabric about said surfaces, and a fastening member for firmly uniting said clamping members to the said fabric.

26. In combination, a strip of fabric and means for enclosing the end of said strip and permitting the same to be rigidly attached to a support, said means comprising a pair of clamping members for engaging opposite sides of the said fabric and provided with end and side flanges so as to completely enclose the said end of the fabric, and a fastening member for firmly uniting said clamping members and the fabric.

27. In combination, a leaf spring, a housing secured to the spring, a vehicle frame, a housing secured to the frame, flexible non-metallic connecting means extending between the housings, and means rigidly clamping the ends of said flexible connecting means in the housings, said housings themselves cooperating in such clamping of the flexible connecting means.

In witness whereof, I have hereunto set my hand this 24th day of June, 1922.

HARVEY W. BELL.